United States Patent [19]

Jayne

[11] Patent Number: 4,839,666

[45] Date of Patent: Jun. 13, 1989

[54] ALL SURFACE IMAGE FORMING SYSTEM

[76] Inventor: William Jayne, P.O. Box 142, San Gregorio, Calif. 94074

[21] Appl. No.: 118,405

[22] Filed: Nov. 9, 1987

[51] Int. Cl.⁴ .............................................. G01D 15/16
[52] U.S. Cl. .................................. 346/75; 346/140 R
[58] Field of Search .................................. 346/75, 140

[56] References Cited

U.S. PATENT DOCUMENTS

| | | | |
|---|---|---|---|
| 2,278,940 | 4/1942 | Murphy | 346/75 X |
| 3,152,858 | 10/1964 | Wadey | 346/75 |
| 3,553,371 | 1/1971 | Suenaga | 358/77 |
| 3,719,952 | 3/1973 | Elbaum | 346/75 |
| 3,792,238 | 2/1974 | Samoel | 346/75 X |
| 4,146,900 | 3/1979 | Arnold | 346/75 |
| 4,314,263 | 2/1982 | Carley | 346/75 X |
| 4,350,986 | 9/1982 | Yamada . | |
| 4,514,742 | 4/1985 | Suga et al. . | |
| 4,628,330 | 12/1986 | Suga et al. . | |
| 4,688,048 | 8/1987 | Uematsu et al. . | |

*Primary Examiner*—Joseph W. Hartary
*Attorney, Agent, or Firm*—Limbach, Limbach & Sutton

[57] ABSTRACT

An image forming system including a reservoir for supplying a deposition medium to a spray head. The deposition medium may include one or more of a wide variety of substances, such as ink or abrasive particles, to be deposited on a surface. In one embodiment, a controlled amount of the deposition medium is supplied from within the spray head out through an orifice in the wall of the spray head by a pneumatically driven deposition medium supply means. In another embodiment, a controlled amount of the deposition medium is drawn out of the orifice by a siphon feed means. Preferably, the system includes not only a siphon means capable of controlling the pressure in a low pressure region near the orifice and the duration in which the low pressure region is maintained, but also an independently controllable means for regulating the amount of deposition medium supplied to the orifice. An optical sensor preferably supplies a beedback signal indicative of the image being deposited on the surface for use in generating control signals for the siphon feed means or deposition medium supply means. One or more independently controllable reservoirs may be provided for supplying variable mixtures of deposition media, such as differently colored inks, to the surface. The system is capable of rapidly producing a high resolution, smooth gray scale image or a high resolution, color image having a continuous range of smoothly varying colors, by controlling the amount and composition of the deposited medium, the density of the deposited drops, the size of the deposited drops, or all of these parameters. The system is capable of depositing a wide variety of fluids or particles on a wide variety of arbitrarily oriented surfaces.

11 Claims, 1 Drawing Sheet

ALL SURFACE IMAGE FORMING SYSTEM

FIELD OF THE INVENTION

The invention relates to image forming systems in which controlled amounts of a deposition medium, such as ink, are sprayed from an orifice for deposition on a surface. More specifically, the invention is a pneumatically driven image forming system capable of supplying a precisely controlled volume of a deposition medium, such as ink, through an orifice for deposition on a surface.

BACKGROUND OF THE INVENTION

Conventional ink jet printing devices operate by squeezing controlled amounts of ink from within a reservoir through a nozzle, such as by varying the reservoir volume with a piezoelectric transducer. However, conventional ink jet printing devices have lacked the capability to produce smooth gray scale images, and the capability to control both the amount of ink deposited and the degree of ink atomization for controlling both the size of the deposited drops and their density. Further, conventional ink jet printing systems have lacked the capability to deposit a wide range of fluids or particles on a wide variety of arbitrarily oriented surfaces.

On the other hand, conventional spray painting devices such as airbrushes produce smooth gray scale images on a variety of surfaces, but have lacked both precision and the capability to produce detailed images rapidly.

In a conventional spray painting apparatus, a fluid is delivered to the surface using a differential pressure (or "siphon feed") mechanism. The siphon effect is produced by a gas stream that flows past an orifice in a spray head. The high velocity gas stream creates a low pressure region near the orifice, which low pressure region draws the deposition medium (which may be ink or paint) out from the spray head through the orifice.

The gas must flow for a sufficient duration to produce sufficiently low pressure to draw the deposition fluid through the orifice. If the flow duration is too short, no fluid will be drawn through the orifice. In order to deposit a single, precisely dimensioned dot on a surface near the orifice, the gas flow must be terminated at a precise time. Accordingly, an accurate control mechanism is required to regulate precisely the amount of deposition fluid drawn through the orifice. Conventional spray painting systems have lacked such accurate control capability.

SUMMARY OF THE INVENTION

The image forming system of the invention includes a reservoir for supplying a deposition medium to a spray head. The deposition medium may include one or more of a wide variety of substances, such as ink or abrasive particles, to be deposited on a surface. In one preferred embodiment, a siphon feed means creates a low pressure region which draws a controlled amount of the deposition medium from within the spray head out through an orifice in the wall of the spray head. In another preferred embodiment, the system includes pneumatically driven means for actively controlling the amount of medium supplied to the orifice. Preferably the system includes not only a siphon feed means capable of controlling the pressure in the low pressure region and the duration over which the low pressure region is maintained, but also independently controllable means for controlling the amount of medium supplied to the low pressure region.

In one preferred embodiment, an optical sensor supplies a feedback signal indicative of the image being deposited on the surface for use in generating control signals for the deposition medium supply means or the siphon feed means. In another preferred embodiment, the system includes means (for example, a needle valve) for varying the size of the orifice in response to control signals. In yet another preferred embodiment, the system includes two or more independently controllable reservoirs, each for supplying a different deposition medium to the spray head. In the latter embodiment, variable amounts of two or more differently colored inks may be supplied to the spray head for forming a color image having a continuous range of smoothly varying colors.

DETAILED DESCRIPTION OF THE PREFERRED EMBODIMENTS

Figure 1:
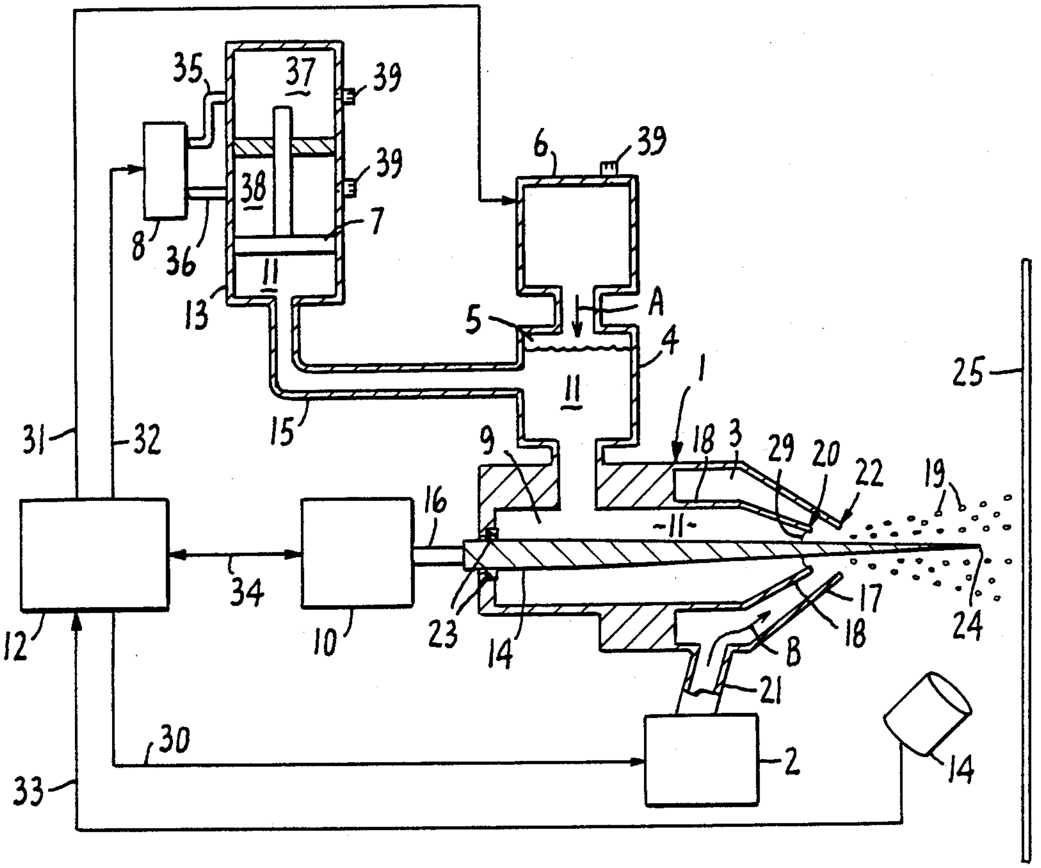
FIG. 1 is a schematic diagram, partially in side cross-sectional view, of a preferred embodiment of the inventive system which includes a single reservoir containing a deposition medium.

A preferred embodiment of the invention will first be described with reference to FIG. 1. Spray head 1 has an outer wall 17 and an inner wall 18 defining gas chamber 3 and passage 9. Reservoir 4 contains deposition medium 11, which may flow from reservoir 4 through passage 9, through orifice 20 in inner wall 18, and out of spray head 1 through orifice 22 in outer wall 17. Tapered needle 14 is positioned within spray head 1 with its tip 24 extending through orifice 22 near surface 25. Pressurized gas (which may be air) is supplied from gas modulator 2 through passage 21 into gas chamber 3 in the direction of arrow B. As the pressurized gas escapes through orifice 22, it creates a low pressure region between orifice 20 and orifice 22, which causes deposition medium 11 within passage 9 to flow out of spray head 1 through orifice 22. The system thus siphons deposition medium 11 from within spray head 1 by producing the described low pressure region near orifice 22.

Particles 19 of deposition medium 11 (which may be atomized droplets in the case that deposition medium 11 is a liquid) that escape from orifice 22 are deposited on surface 25 to produce a pattern having size characterized by diameter D. As head 1 is moved relative to surface 25, an image may be formed on surface 25. The image may comprise a layer deposited on surface 25, for example, if deposition medium 11 is an ink or paint. Alternatively, the image may comprise a layer eroded or otherwise removed from surface 25, for example if deposition medium 11 includes abrasive particles such as sand, or consists of an abrasive powder.

Control unit 12, which may be a digital computer, generates control signals and supplies them on line 30 to modulator 2. Modulator 2 preferably includes a supply of pressurized gas and a valve. The pressurized gas has pressure on the order of 80 p.s.i. in one preferred embodiment. However, it is specifically contemplated that the gas may have any desired pressure, or that the gas pressure may be variable over any desired range. The valve may be selected from those commercially available which are capable of being switched in response to electric control signals.

Since pressurized gas from unit 2 affects the amount of deposition medium drawn from passage 9, the control signals supplied on line 30 must ensure that the pressurized gas maintains the low pressure region for a duration sufficient to produce on surface 25 a pattern having desired characteristics. Since the system relies on the described siphon effect to deposit medium 11 on surface 25, system reliability depends on the rate at which medium 11 is delivered to orifice 20. In the embodiment shown in FIG. 1, because orifice 20 is very near the gas stream flowing from chamber 3 through orifice 22 and because medium 11 fills passage 9 so that interface 29 between medium 11 and the surrounding atmosphere is adjacent orifice 20, medium 11 will be rapidly urged into the low pressure region between orifice 20 and orifice 22, and will have low (or substantially zero) velocity when it is drawn into the pressurized gas stream. In variations on the FIG. 1 embodiment, medium 11 may need to be drawn through a substantial distance before it merges with the pressurized gas stream. In these variations, medium 11 will acquire a significant flow velocity before it merges with the pressurized gas stream, and accordingly, it becomes difficult to predict precisely the amount of medium that will enter the low pressure region in any given interval. Additionally, many other variables affect the delivery rate of deposition medium to the low pressure region, including temperature, viscosity, and moisture content. It may become very expensive to control such variables, especially where the image forming system is intended for use with a wide variety of deposition media, to form images on a wide variety of variously oriented surfaces. We have recognized that in order to enhance system reliability, controllable gas modulator means 2 must be supplemented by means for actively controlling the amount of medium 11 supplied to the low pressure region (i.e., the amount of medium escaping through orifice 20 in any time interval of interest).

The FIG. 1 system includes pneumatically driven deposition medium modulators 6 and 8, and piston assembly 7 for actively controlling the amount of medium 11 supplied to the low pressure region. Reservoir 4 contains a volume of medium 11 and a volume of gas 5. The pressure of medium 11 is maintained by controlling the position of piston 7 in unit 13. In order to supply a desired amount of medium 11 through orifice 20 to the low pressure region, modulator 6 supplies a pressure impulse to gas 5 in the direction of arrow A. Gas 5 thus displaces a desired amount of medium 11 from reservoir 4. This displaced amount in turn displaces a corresponding amount of medium 11 from chamber 9 through orifice 20. In one preferred embodiment, modulator 6 includes a supply of pressurized gas and a valve for releasing selected amounts of gas in response to control signals received on line 31. In this embodiment, modulator 6 may include an outlet port 39 for releasing excess gas from within the modulator. Alternatively, instead of pneumatic driving means, modulator 6 may include a piezoelectric transducer of the type well known in the field of ink jet printing, or any other conventional pressure transducer of the type controllable by remotely generated control signals such as those supplied from control unit on line 31. Modulator 6 may supply pressure signals having any of a variety of waveforms.

The position of piston 7 within housing 13 is controlled by the relative volume of fluid in chambers 37 and 38. Modulator 8 includes conventional means for supplying desired amounts of fluid to chambers 37 and 38 through fluid lines 35 and 36, respectively. For example, modulator may include a supply of pressurized gas and a valve for selectively releasing gas through line 35 or 36. In this embodiment, chamber 37 and 38 may each include an outlet port 39 for releasing excess gas from within each chamber. Control signals supplied on line 32 from control unit 12 to modulator 8 control means in modulator 8, such as the mentioned valve, for varying the relative fluid volume in chambers 37 and 38.

Even if medium 11 is actively and precisely controlled by modulators 6 and 8 and the apparatus associated therewith, it is desirable also to include feedback means, for example to compensate for changes within the system environment or in the characteristics of medium 11. Preferably, visual feedback signals generated by monitoring the image being formed on surface 25 will be employed. Accordingly, optical sensor 14 is included in a preferred embodiment of the invention. Optical sensor, which may be a conventional photodiode or other conventional optical sensor, generates optical feedback signals indicative of the image being formed on surface 25 and supplies these signals to control unit 12 on line 33. In control unit 12, the feedback signals may be used in generating appropriate control signals for one or more of modulators 2, 6, 8, and 10 (to be discussed below). For example, sensor 14 may provide an indication of the size D of the image element produced on surface 25.

System versatility is enhanced by including means for varying the size of orifice 22, although in some embodiments such means need not be included. In the FIG. 1 system, tapered needle may be translated parallel to its longitudinal axis to vary the available size of both orifice 20 and orifice 22. O-ring seal 23 prevents medium 11 from escaping from chamber 9 except through orifice 20. Needle position modulator 10, connected to needle 14 by member 16, translates needle 14 in response to control signals received from control unit 12 on line 34. Modulator 10 may include motor controlled by such control signals and a gear or screw assembly powered by the motor. In one embodiment, modulator 10 may include a position sensor which supplies feedback signals to control unit 12 on line 34 for use in control 12 for generating appropriate control signals for controlling the positioning means in modulator 10. Alternatively, modulator 10 need not be controlled by signals supplied from unit 12, but instead may include a manually operated screw assembly. In operation, the needle may be positioned to open orifice 22 to its maximum size to enable cleaning of the system. The system may operate in a self cleaning mode, in which, for example, high pressure gas (but no medium 11) flows through orifice 22. The needle position may also be varied to perform system calibration.

The system may be operated in a wide variety of operating modes. For example, to achieve a stippling effect, the flow of gas from modulator 2 may be restricted (or eliminated) while one or more loads of deposition medium (having any desired volume) are sequentially released from orifice 20 so as to pass through orifice 22, in response to a series of pressure impulses generated by modulator 6. To operate in this mode, the system need not include modulator 2. In another operating mode (which does require modulator 2), a continuous stream of medium 11 may be supplied from orifice 20 while a continuous stream of pressurized gas from passage 21 is simultaneously supplied.

To achieve extremely high resolution, modulator 2 may supply a stream of highly pressurized gas, while modulator generates a pressure impulse sufficient to release a very small volume of medium from orifice 20. In this mode, it is desirable that a tapered needle (which smoothly tapers to a sharp tip) be positioned so as to extend out from orifice 22 as shown in FIG. 1. The medium released from orifice 20 will be drawn by the pressurized gas stream along the needle 14 to its tip 24. A spray of droplets or particles of medium 11 will then flow from tip 24 to surface 25, in a manner so that size D of the resulting image element on surface 25 will be very small. If spray head 1 is translated parallel to surface 25 (for example in a direction into the plane of FIG. 1) while operating in this high resolution mode, a fine line (having width D) will be produced on surface 25.

Other operating modes will be apparent to those of ordinary skill in the art. For example, the ratio of medium flow rate to pressurized gas flow rate may be varied to vary the size D of the image element produced on surface 25. (It should be appreciated that the image element whose size is characterized by dimension D in FIG. 1 may be merely one of many elements of a large image produced by repeatedly operating spray head 1 and translating spray head 1 relative to surface 25 after each operating cycle). The density of droplets (or particles) comprising each image element may be varied by modulating the pressurized gas flow rate. Thus, the overlap between adjacent image elements produced on surface 25 may differ in different system operating modes.

Software for programming control unit 12 to generate appropriate control signals in response to operator supplied commands, and to supply the signals on appropriate ones of lines 30, 31, and 34 may readily be produced by an ordinarily skilled programmer. Similarly, software which generates such control signals as a function of feedback signals received on lines 33 and 34 may readily be produced by an ordinarily skilled programmer. Control unit 12 may be an appropriately programmed conventional computer system, such as a personal computer.

Figure 2:
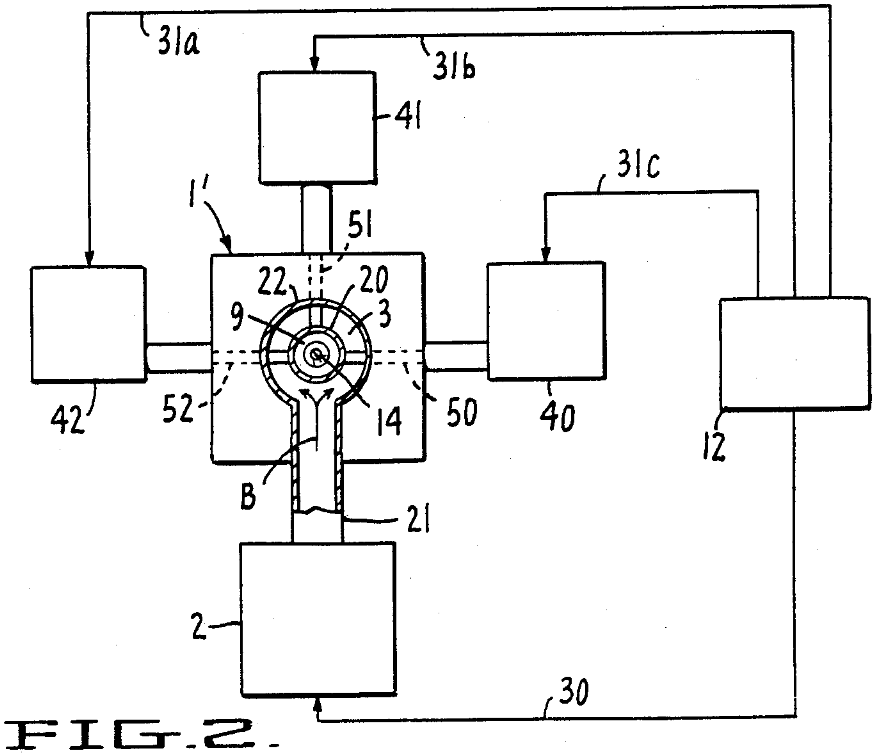
FIG. 2 is a simplified end view of a preferred embodiment of the inventive system which includes a single orifice and three independently controllable reservoirs, each reservoir containing a different deposition medium.

FIG. 2 is an example of another preferred embodiment of the invention, in which the inventive system includes two or more reservoirs, each of which may contain a different deposition medium. The FIG. 2 system includes three identical deposition fluid reservoirs, identified by numerals 40, 41, and 42. Each of reservoirs 40–41 may have the same construction as reservoir 4 of the FIG. 1 system. Similarly, each may be controlled by modulation equipment, such as modulators 6 and 8 and the components shown in FIG. 1 that are associated therewith, which equipment is in turn controllable by signals supplied from control unit 12 on one of lines 31*a*, 31*b*, and 31*c*.

Spray head 1' of the FIG. 2 system (like spray head 1 of the FIG. 1 system) includes a single orifice 22 through which pressurized gas may flow. As in the FIG. 1 system, the pressurized gas is supplied from modulator 2 through passage 21. Spray head 1' also includes gas chamber 3, passage 9, and needle 14 corresponding to the elements having the same reference numerals in the FIG. 1 system. Deposition medium may flow to passage 9 from each of reservoirs 40, 41, and 42 through passages 50, 51, and 52 respectively. The deposition medium in passage 9, which may be a mixture of deposition media from two or more of the reservoirs 40–41, emerges from orifice 22. The deposition medium may then be drawn into a low pressure region produced by pressurized gas flow in the volume between orifice 20 and orifice 22, and drawn out of orifice 22 as in the FIG. 1 system.

Each reservoir may contain a different type of deposition medium. For example, each may contain a differently colored ink. By varying the relative amount of each ink drawn into passage 9 through passages 50–52, differently colored ink mixtures may be supplied to orifice 20 for deposition on a nearby surface. An optical sensor (such as sensor 14 of FIG. 1) may be positioned near the surface for supplying visual feedback signals to control unit 12 as in the FIG. 1 system. The sensor may detect the color of the deposition media mixture being deposited on the surface, so that the signals fed back from the sensor to control unit may be used to adjust the control signals produced in unit 12 and supplied to the reservoirs on lines 31*a*, 31*b*, and 31*c*, and to unit 2 on line 30.

Various modifications and alterations in the structure and method of operation of this invention will be apparent to those skilled in this art without departing from the scope and spirit of the invention. Although the invention has been described in connection with specific preferred embodiments, it should be understood that the invention as claimed should not be unduly limited to such specific embodiments.

What is claimed is:

1. An image forming system, including:

(a) a reservoir for containing a deposition medium;

(b) a spray head having a wall, wherein a first orifice, a second orifice, and a third orifice extend through the wall, wherein the spray head is connected to the reservoir so that a volume of the deposition medium may flow from the reservoir through the first orifice into the spray head;

(c) a gas modulator connected to the spray head so that a volume of pressurized gas may flow through the second orifice into the spray head to produce a low pressure region adjacent the third orifice, wherein said low pressure region will draw the volume of the deposition medium out of the spray head through the third orifice, and wherein a first control signal triggers pressurized gas flow from the gas modulator into the spray head, and a second control signal terminates pressurized gas flow from the gas modulator into the spray head after a selected flow duration; and (d) control means for generating each control signal.

2. The system of claim 1, also including: a deposition medium modulator connected to the reservoir and to the control means, for releasing a controlled volume of deposition medium from the reservoir to the spray head in response to at least one control signal from the control means.

3. The system of claim 2, wherein a third control signal from the control means triggers the flow of a selected volume of deposition medium from the reservoir to the low pressure region.

4. The system of claim 2, also including:

(g) a tapered needle positioned in the third orifice, in a position such that the needle has a tip extending outside the spray head.

5. The system of claim 4, wherein the controlled volume of deposition medium is supplied to the spray head while pressurized gas flows from within the spray head out through the third orifice, and wherein the controlled volume of deposition medium and the pressure of the pressurized gas are sufficient to cause a substantial portion of the volume of deposition medium to flow along the needle to the needle's tip.

6. The system of claim 1, also including:

(f) an optical sensor connected to the control means for supplying a feedback signal to the control means for use in generating at least one control signal.

7. An image forming system, including:

(a) a reservoir for containing a deposition medium;

(b) a spray head having a wall, a deposition medium passage, and a gas chamber, wherein a first orifice, a second orifice, and a third orifice extend through the wall, wherein the deposition medium passage extends between and provides fluid communication between the first orifice and the third orifice, wherein the spray head is connected to the reservoir so that a volume of the deposition medium may flow from the reservoir through the first orifice into the deposition medium passage, and wherein the gas chamber extends between and provides fluid communication between the deposition medium passage, the second orifice, and the third orifice;

(c) a gas modulator connected to the spray head for supplying a volume of pressurized gas through the second orifice into the gas chamber in response to at least one control signal, in such a manner that the pressurized gas will produce a low pressure region adjacent the third orifice, wherein said low pressure region will draw the volume of the deposition medium out f the deposition medium passage out of the spray head through the third orifice;

(d) control means connected to the gas modulator for generating each control signal and supplying each said control signal to the gas modulator; and (e) a deposition medium modulator connected to the reservoir and to the control means, for releasing a controlled volume of deposition medium from the reservoir through the deposition medium passage to the low pressure region in response to at least one control signal from the control means.

8. The system of claim 7, wherein the deposition medium modulator includes means for reducing the volume of the reservoir available for containing deposition medium so as to force a corresponding volume of deposition medium out from the reservoir through the second orifice to the low pressure region in response to a first control signal.

9. The system of claim 7, also including:

(g) an optical sensor connected to the control means for supplying a feedback signal to the control means for use in generating at least one control signal.

10. The system of claim 9, also including:

(h) a tapered needle positioned in the third orifice, in a position such that the needle has a tip extending outside the spray head.

11. The system of claim 10, wherein a first volume of deposition medium is supplied from the reservoir to the low pressure region while pressurized gas flows from within the gas chamber of the spray head out through the third orifice, and wherein the volume of deposition medium and the pressure of the pressurized gas are sufficient to cause a substantial portion of the first deposition medium volume to flow along the needle to the needle's tip.

* * * * *

US004839666B1

REEXAMINATION CERTIFICATE (2386th)

United States Patent [19]

[11] B1 4,839,666

Jayne

[45] Certificate Issued Sep. 13, 1994

[54] ALL SURFACE IMAGE FORMING SYSTEM

[76] Inventor: William Jayne, P.O. Box 142, San Gregorio, Calif. 94074

Reexamination Request:
No. 90/003,173, Aug. 25, 1993

Reexamination Certificate for:
Patent No.: 4,839,666
Issued: Jun. 13, 1989
Appl. No.: 118,405
Filed: Nov. 9, 1987

[51] Int. Cl.[5] .................. B41J 2/11
[52] U.S. Cl. .................. 346/75; 346/140 R
[58] Field of Search .................. 346/75

[56] References Cited

U.S. PATENT DOCUMENTS

| | | | |
|---|---|---|---|
| 1,709,926 | 4/1929 | Weaver . | |
| 2,721,763 | 10/1955 | Miner | 299/86 |
| 3,152,858 | 10/1964 | Wadey | 346/75 |
| 3,553,371 | 1/1971 | Suenaga | 178/5.2 |
| 3,567,923 | 3/1971 | Hutchison | 250/226 |
| 3,719,995 | 3/1973 | Elbaum | 346/75 |
| 3,969,114 | 7/1976 | Prats | 96/1.4 |
| 4,102,500 | 7/1978 | Luff | 239/345 |
| 4,146,900 | 3/1979 | Arnold | 346/75 |
| 4,248,527 | 2/1981 | Akiyama et al. | 355/14 R |
| 4,313,671 | 2/1982 | Kuru | 355/14 D |
| 4,492,360 | 1/1985 | Lee et al. | 251/129 |
| 4,514,742 | 4/1985 | Suga et al. | 346/140 R |
| 4,533,234 | 8/1985 | Watai et al. | 355/14 D |
| 4,613,875 | 9/1986 | Le et al. | 346/140 R |

*Primary Examiner*—J. W. Hartary

[57] ABSTRACT

An image forming system including a reservoir for supplying a deposition medium to a spray head. The deposition medium may include one or more of a wide variety of substances, such as ink or abrasive particles, to be deposited on a surface. In one embodiment, a controlled amount of the deposition medium is supplied from within the spray head out through an orifice in the wall of the spray head by a pneumatically driven deposition medium supply means. In another embodiment, a controlled amount of the deposition medium is drawn out of the orifice by a siphon feed means. Preferably, the system includes not only a siphon means capable of controlling the pressure in a low pressure region near the orifice and the duration in which the low pressure region is maintained, but also an independently controllable means for regulating the amount of deposition medium supplied to the orifice. An optical sensor preferably supplies a beedback signal indicative of the image being deposited on the surface for use in generating control signals for the siphon feed means or deposition medium supply means. One or more independently controllable reservoirs may be provided for supplying variable mixtures of deposition media, such as differently colored inks, to the surface. The system is capable of rapidly producing a high resolution, smooth gray scale image or a high resolution, color image having a continuous range of smoothly varying colors, by controlling the amount and composition of the deposited medium, the density of the deposited drops, the size of the deposited drops, or all of these parameters. The system is capable of depositing a wide variety of fluids or particles on a wide variety of arbitrarily oriented surfaces.

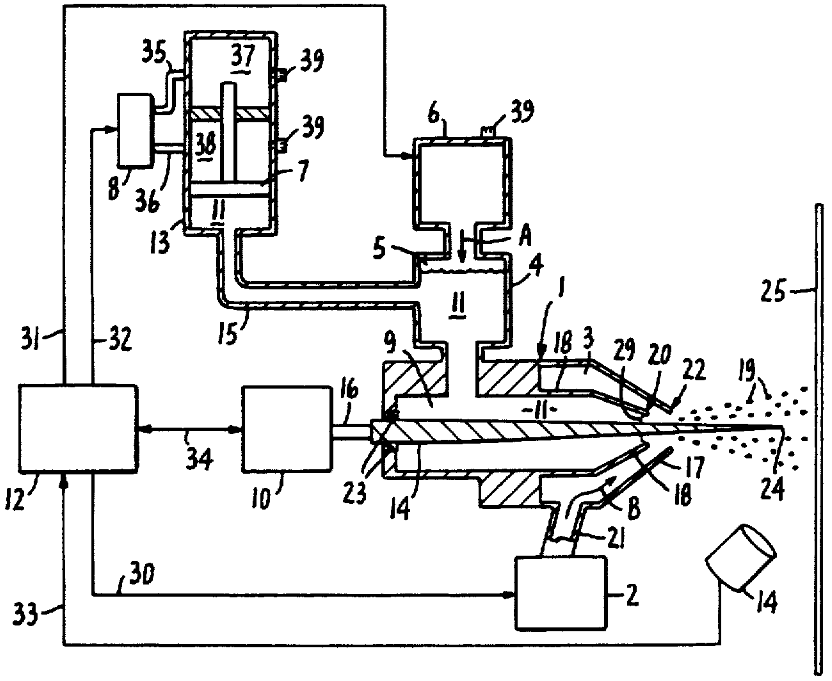

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2–5 and 7–11 is confirmed.

Claims 1 and 6 are cancelled.

* * * * *